Oct. 28, 1952 R. J. VEDOVELL 2,615,739
OIL SEAL
Filed Jan. 8, 1948
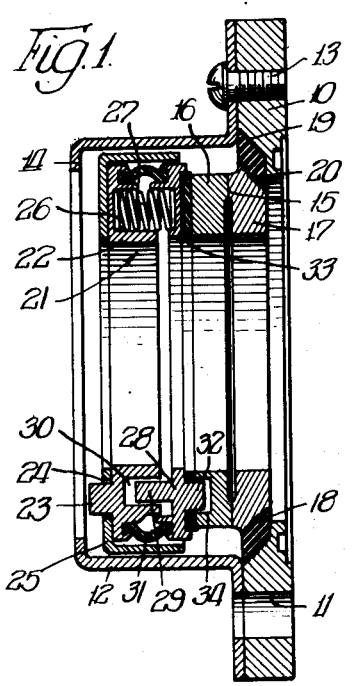
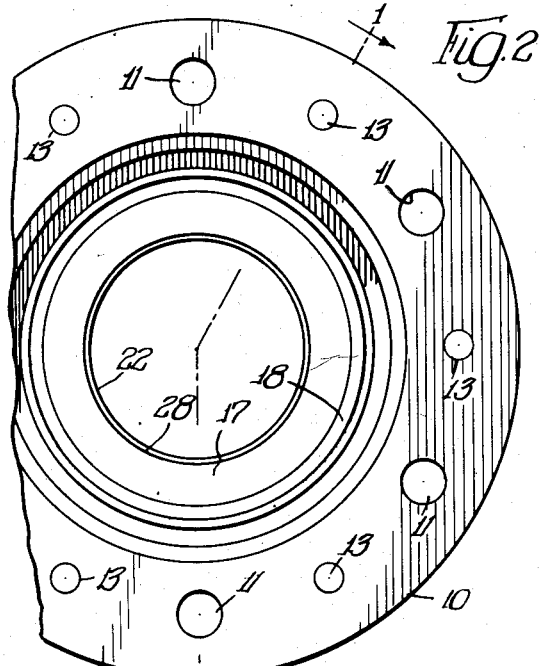
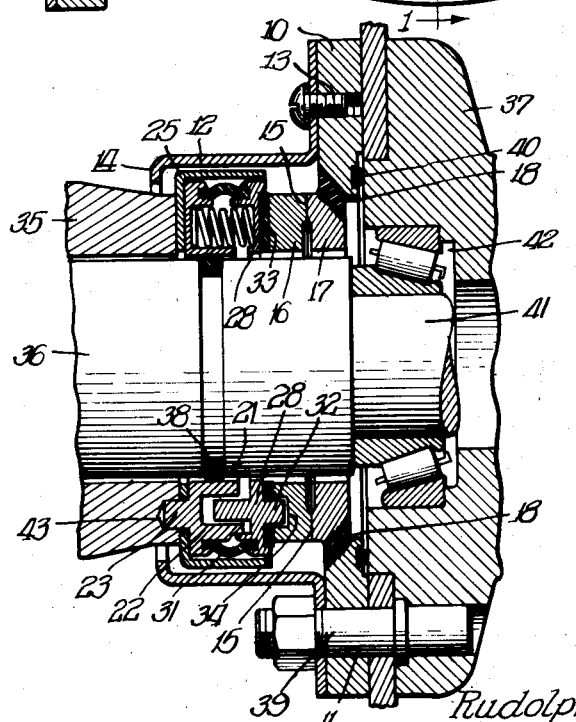
INVENTOR.
Rudolph J Vedovell,
BY
Cromwell, Greist & Warden
attys.

Patented Oct. 28, 1952

2,615,739

UNITED STATES PATENT OFFICE 2,615,739

OIL SEAL

Rudolph John Vedovell, Kenilworth, Ill., assignor to Chicago Rawhide Manufacturing Company, Chicago, Ill., a corporation of Illinois Application January 8, 1948, Serial No. 1,222

4 Claims. (Cl. 288—3)

The subject of this invention is an improved seal for shafts, axles and the like, which is adapted to prevent leakage or loss of oil or other fluids from, as well as entry of dust, dirt or foreign matter to, the parts which it is desired to seal.

It is a general object of the invention to provide a unitary, self-contained seal including an annular end face sealing element adapted to be mounted in rotatively fixed but axially yieldable relation to one of a pair of relatively rotating parts and a mating ring adapted for rotatable engagement with said element and in a novel angularly fixed but axially yieldable relation to the other of said parts.

A further object is to provide a unitary, self-contained seal assembly including a flanged mounting plate adapted to be readily and quickly secured to the exterior of one of a pair of relatively rotating parts, which plate has a mating ring component of the seal associated therewith by means of a resilient annular connector, said connector being bonded to the mating ring and to the plate in a fashion to afford an axially yieldable support for the mating ring which is capable of sustaining rotative torque on said mating ring in a cushioned resilient manner, together with a sealing ring rotatively engaging said mating ring, a spring assembly urging said sealing ring against the mating ring, and an improved casing structure externally housing and shielding said rings and spring assembly, as well as guiding the same and serving to retain said spring assembly, or its component parts, against removal from operative relation to the other parts.

A further object is to provide a seal assembly of the type referred to in the preceding paragraph, in which said spring assembly abuts a face of the other of said pair of relatively rotating parts, in the operative installed relation of the seal to said parts, and in which said casing is open at the end thereof adjacent said other part to permit such abutment while at the same time being provided with means to retain any part of the spring assembly, and also the sealing ring operatively associated therewith, from separation or removal prior to being operatively installed.

The foregoing statements are indicative in a general way of the nature of the invention, but other and more specific objects will be apparent to those skilled in the art upon a full understanding of the construction and operation of the device.

A single embodiment of the invention is presented herein for purpose of exemplification, but it will be appreciated that the invention is susceptible of incorporation in other modified forms coming equally within the scope of the appended claims.

In the drawings,

Fig. 1 is a view in axial section through a seal in accordance with the invention, taken approximately along line 1—1 of Fig. 2;

Fig. 2 is a fragmentary view in end elevation, as viewed from the right of Fig. 1; and Fig. 3 is a fragmentary sectional view, generally similar to Fig. 1, illustrating the seal as assembled in operative relation to a pair of relatively rotatable parts, for example the hub of a rotatable track roller or bogie and a fixed axle therefor.

Referring to Figs. 1 and 2 of the drawings, wherein the unitary, self-contained nature of the present seal is clearly illustrated, the reference numeral 10 designates a rigid, annular mounting ring or plate which is adapted to be fixedly and concentrically secured with respect to one of the pair of rotatable parts to be sealed, being provided with a circumferentially spaced series of stud-receiving apertures 11 for this purpose.

The flanged, cup-like, sheet metal stamping 12 is fixedly secured to plate 10, in concentric relation thereto, as by a plurality of screws 13 extending through holes of the stamping flange into tapped holes in the plate, so as to define a casing, shield or housing within which the operating parts of the seal are enclosed. Said casing has an inwardly flanged rim 14 which acts as an axial stop to prevent possible separation of said parts in the axial direction.

A running, end face seal is effected at the axial sealing surface 15 between an annular steel sealing ring or nose piece 16 and a coacting concentric steel mating ring 17. The mating ring is in rotatively fixed, though cushioned, relation to the plate 10, while the sealing ring or nose piece 16 is adapted to be secured in axially fixed relation to another part, by certain provisions to be hereinafter described.

Mating ring 17 is connected to the mounting plate 10 by means of a resilient joint or connector 18 constituted by an annular rubber or synthetic rubber cushion molded, vulcanized or cemented between the ring or plate onto spaced, opposed or complementary surfaces 19, 20 thereof. The joint is made so as to permit some resilient axial yieldability of the mating ring, as well as to afford a cushioned torque support for the latter, while preventing substantial rotation relative to the mounting plate 10.

In order to increase the efficiency of the bond, the opposed, joined surfaces 19, 20 of the mounting plate and mating ring, respectively, are inclined radially and axially in a conical section and are ribbed, corrugated or otherwise roughened in order to improve the effectiveness of the bonded connection between the cushion 18 and the aforesaid parts.

The sealing ring 16 is sustained axially by a sub-assembly which is generally designated 21. This includes a stamped or forged annular spring support 22 concentric with the ring, provided with a plurality of relatively spaced lugs 23 which project rearwardly in an axial direction and are adapted to be engaged in appropriate recesses in an adjoining surface of one of the parts to be sealed, thereby rotatively securing said base and the remainder of sub-assembly 21 to said part, in a manner to be described. Lugs 23 are received in correspondingly spaced holes 24 of an annular sheet metal protector cup or shell 25, the axial flange of which surrounds the parts of the sub-assembly 21. This shell is engageable with the rim 14 of casing or housing 12 to prevent possible separation of the components of the seal prior to final assembly to the parts to be sealed.

The annular spring support 22 is provided with a plurality of circumferentially spaced recesses 26, each adapted to receive one end of a coil spring 27 whereby the sealing ring 16 is thrust axially. The opposite ends of these springs abut the rear surface of a thrust and locking ring 28 which is keyed against rotation relative to spring support 22 by means of a plurality of lugs 29 which extend rearwardly into correspondingly shaped recesses 30 of said support.

A flexible, sleeve-type diaphragm 31 is disposed coaxially of and between the support 22 and locking ring 28, being clamped at its opposite edges in mutually facing channels of said members, in accordance with a well known practice. The locking ring 28 has a further series of forwardly projecting lugs 32 which extend through apertures in an interposed sealing gasket 33 into correspondingly located recesses 34 on the rear side of sealing ring 16. Thus the sealing ring 16, locking ring 28, support 22 and protector shell 25 are all positively keyed together and sustained as a unit in angularly fixed relation to one of the pair of relatively rotatable parts to be sealed.

The above seal is illustrated in its operative, mounted relation to the parts to be sealed, such as an axle housing 35 through which the fixed axle 36 extends, and a relatively rotatable member, such as the hub 37 of a tractor bogie or roller.

In assembling the parts, it is desirable to interpose a sealing O-ring 38 between axle 36 and the inner surface of the base member 22, this O-ring being located in an annular groove in the axle and serving to prevent axial leakage along the shaft between the seal sub-assembly 21 and the running seal at surface 15.

The mounting plate 10 is bolted to the roller hub 37 by means of studs 39, whereby said plate, the housing 12 and the mating ring 17 are caused to rotate with the roller or bogie. An additional O-ring 40 is preferably interposed axially between mounting plate 10 and the roller hub 37, being cemented in place and substantially compressed in the axial direction to prevent possibility of radial leakage past the mounting plate. The roller hub 37 is rotatably mounted upon a reduced portion 41 of axle 36 by means of a standard roller bearing 42. The lugs 23 of spring support 22 are received in locking recesses 43 of the axle housing 35, thereby fixedly associating the seal sub-assembly 21 and sealing ring 16 with said axle housing and axle 36.

In operation, the flexible bonded cushion 18 permits sufficient axle yielding of mating ring 17 to enable a perfect running engagement of the latter with the sealing ring 16 at the sealing surface 15, and will preserve said perfect running engagement notwithstanding future or existing misalignment of the parts. Torque incident to the frictional running engagement of members 16, 17 is directly absorbed to the relatively rotatable parts through said bonded cushion and through the sub-assembly 21, without any tendency to interfere with the efficiency of the running seal. The various elements of the seal are very expeditiously produced and assembled from stampings, forgings or castings and require little accuracy of machine work in their production.

I claim:

1. In an end face seal of the type characterized by a mating ring, a relatively rotatable nose piece for sealing engagement with the ring, and expansion means behind the nose piece connected with the latter for pressing the nose piece axially against the ring, which seal is adapted for application to a face of one member about a relatively rotatable shaft, in endwise abutment with a face of a second member associated with said shaft; the provision of a self-contained unit for housing the aforesaid seal parts in operative relation to each other for ready application to the aforesaid shaft and members, said unit including a rigid annular plate for detachable fluid-tight engagement with the face of the first mentioned member, means for floatingly supporting the mating ring of the seal from said plate, and a tubular casing of less diameter than the plate distinct from but fixedly supported by and extending axially from the latter in encompassing but slidably guiding relation to the expansion means of the seal, which casing is open at its far end to permit abutment of the expansion means of the seal with the face of said second member, in the operatively installed condition of the seal, and is provided at such end with integral means for axially engaging and retaining the expansion means against removal, said casing being provided with a radially extending flange disposed in face-to-face engagement with said plate and having means securing said flange to said plate, said plate and casing serving to maintain the mating ring and nose piece of the seal in approximate register prior to installation of the unit, said casing functioning before and after installation as a protective covering for all said seal parts, said expansion means being axially compressed in said installed condition to a position out of axial engagement with said retaining means.

2. In an end face seal of the type characterized by a mating ring, a relatively rotatable nose piece for sealing engagement with the ring, and expansion means behind the nose piece connected with the latter for pressing the nose piece axially against the ring, which seal is adapted for application to a face of one member about a relatively rotatable shaft, in endwise abutment with a face of a second member associated with said shaft; the provision of a self-contained unit for housing the aforesaid seal parts in operative relation to each other for ready application to the aforesaid shaft and members, said unit including a rigid annular plate for detachable fluid-tight engagement with the face of the first mentioned member, means for floatingly supporting the mating ring of the seal from said plate, and a tubular casing of less diameter than the plate distinct from but fixedly supported by and extending axially from the latter in encompassing but slidably guiding relation to the expansion means of the seal, which casing is open at its far end to permit abutment of the expansion means of the seal with the face of said second member, in the operatively installed condition of the seal, and is provided at such end with integral means for axially engaging and retaining the expansion means against removal, said casing being provided with a radially extending flange disposed in face-to-face engagement with said plate and having means securing said flange to said plate, said plate and casing serving to maintain the mating ring and nose piece of the seal in approximate register prior to installation of the unit, said casing having an imperforate sleeve-like wall and functioning before and after installation as a protective covering for all said seal parts, said expansion means being axially compressed in said installed condition to a position out of axial engagement with said retaining means.

3. In an end face seal of the type characterized by a mating ring, a relatively rotatable nose piece for sealing engagement with the ring, and expansion means behind the nose piece connected with the latter for pressing the nose piece axially against the ring, which seal is adapted for application to a face of one member about a relatively rotatable shaft, in endwise abutment with a face of a second member associated with said shaft; the provision of a self-contained unit for housing the aforesaid seal parts in operative relation to each other for ready application to the aforesaid shaft and members, said unit including an annular plate for detachable fluid-tight engagement with the face of the first mentioned member, means for floatingly supporting the mating ring of the seal from said plate, and a tubular casing distinct from but fixedly secured to said plate, said casing being adapted to be supported at one end by one of said members and to extend toward the other in encompassing but slidably guiding relation to a portion of the seal, which casing is open at its end remote from said supported end, in the operatively installed condition of the seal, and is provided adjacent said open end with integral means for axially engaging and retaining the expansion means against removal, said casing being provided with a radially extending flange disposed in face-to-face engagement with said plate and having means securing said flange to said plate, said plate and casing serving to maintain the mating ring and nose piece of the seal in approximate register prior to installation of the unit, said expansion means being axially compressed in said installed condition to a position out of axial engagement with said retaining means.

4. In an end face seal of the type characterized by a mating ring, a relatively rotatable nose piece for sealing engagement with the ring, and expansion means behind the nose piece connected with the latter for pressing the nose piece axially against the ring, which seal is adapted for application to a face of one member about a relatively rotatable shaft, in endwise abutment with a face of a second member associated with said shaft; the provision of a self-contained unit for housing the aforesaid seal parts in operative relation to each other for ready application to the aforesaid shaft and members, said unit including an annular plate for detachable fluid-tight engagement with the face of the first mentioned member, means for floatingly supporting the mating ring of the seal from said plate, and a tubular casing distinct from but fixedly secured to said plate, said casing being adapted to be supported at one end by one of said members and to extend toward the other in encompassing but slidably guiding relation to the expansion means of the seal, which casing is open at its end remote from said supported end, in the operatively installed condition of the seal, and is provided adjacent said open end with integral means for axially engaging and retaining the expansion means against removal, said casing being provided with a radially extending flange disposed in face-to-face engagement with said plate and having means securing said flange to said plate, said plate and casing serving to maintain the mating ring and nose piece of the seal in approximate register prior to installation of the unit, said expansion means being axially compressed in said installed condition to a position out of axial engagement with said retaining means.

RUDOLPH JOHN VEDOVELL.

REFERENCES CITED

The following references are of record in the file of this patent:

UNITED STATES PATENTS

| Number | Name | Date |
|---|---|---|
| 1,292,197 | Williams | Jan. 21, 1919 |
| 2,322,834 | Dornhofer | June 29, 1943 |
| 2,414,600 | Land et al. | Jan. 21, 1947 |
| 2,472,264 | Payne | June 7, 1949 |
| 2,480,908 | Davies | Sept. 6, 1949 |
| 2,500,898 | Hastings | Mar. 14, 1950 |